Sept. 20, 1960   W. E. SCHULZ   2,953,447
IGNITION COMPOSITIONS
Filed Aug. 8, 1957

INVENTOR
WILLIAM E. SCHULZ
BY *Thos. J. Wilson*
ATTORNEY

United States Patent Office 2,953,447
Patented Sept. 20, 1960

2,953,447
IGNITION COMPOSITIONS

William E. Schulz, Wenonah, N.J., assignor to E. I. du Pont de Nemours and Company, Wilmington, Del., a corporation of Delaware Filed Aug. 8, 1957, Ser. No. 677,048

2 Claims. (Cl. 52—2)

The present invention relates to readily ignitable compositions and, more particularly, to such compositions suitable for use in electrically actuated squibs and like devices.

Squibs and like devices often are used in applications, both military and civil, which require that the squib compositions have such properties as ready ignitability only by relatively high firing currents, e.g., those in the range of 1 to 5 amperes; fast functioning times, i.e., very little lag in time between the application of the firing current and the actual igniting of the ignition composition; resistance to deterioration at high temperatures and pressures, yet dependable performance at low temperatures and pressures; and the like. In certain squib applications, such as in rocket ignition, resistance to ammonia gas and mimum brisance also are desirable. However, the compositions used heretofore in squibs and the like have lacked many or all of these important characteristics. Hence, progress in the development of squibs for many uses has been hindered.

Accordingly, an object of the present invention is to provide ignition compositions for squibs and the like having dependable ignitability and fast functioning times.

Another object of the present invention is to provide ignition compositions having good resistance to high temperatures and dependable performance at low temperatures and pressures.

An additional object of the present invention is to provide ignition compositions which are ignited only by relatively high temperatures or high firing currents.

A still further object of the invention is to provide ignition compositions resistant to ammonia gas.

Other objects will become apparent as the invention is further described.

I have found that the foregoing objects may be achieved when I use as an ignition composition an intimate blend of magnesium and tellurium dioxide.

In accordance with the invention, an ignitable composition, e.g., for electrically actuated squibs and like devices, comprises an intimate mixture of magnesium and tellurium dioxide, the magnesium being present in an amount by weight between about 5 and about 50% of the mixture. Optionally, the mixtures of the present invention also may include tellurium.

Figure 1:
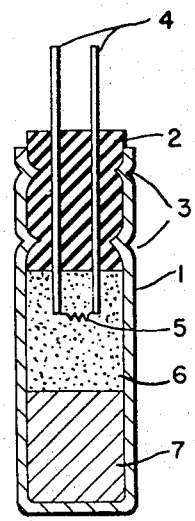
Figure 2:
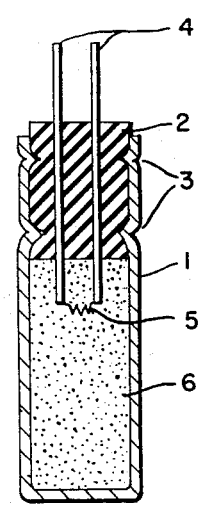

In order to illustrate the invention more fully, reference now is made to the accompanying drawings, in which:

Figure 1 represents one embodiment of using the compositions of the invention; and Figure 2 represents an alternative embodiment. These embodiments are for illustrative purposes only and are not to be construed as limiting the invention in any manner. The parts in the specification are parts by weight.

Referring now to the figures in detail, 1 is a tubular shell, e.g., of aluminum, 2 is a sealing plug, e.g., of natural or synthetic rubber, 3 are peripheral crimps in the shell wall for maintaining the plug in position, 4 are leg wires, 5 is a resistance bridgewire, 6 is a loosely packed intimate blend of magnesium, tellurium, and tellurium dioxide, e.g., a 5/88/7, a 27/67/6, or a 36/59/5 blend, and 7 is a compressed base charge, e.g., of lead azide, lead styphnate, diazodinitrophenol, RDX, black powder, or like detonating or deflagrating compounds or mixtures. It will be noted that in the embodiment of Figure 2, charge 6 is the only charge present in the igniter, charge 7 being omitted.

As to the mode of functioning of the squib embodiments shown, passage of an electric current through the leg wires 4 and the bridgewire 5 causes the latter wire to become heated sufficiently to ignite composition 6. Charge 7, when present, is, in turn, initiated or ignited by charge 6.

The compositions of the invention, namely, intimate blends of magnesium, tellurium and tellurium dioxide, have unique properties which make them much more desirable for use in electrically actuated squibs and like devices than previously known compositions. For example, the compositions of the present invention have much higher ignition temperatures than other known squib compositions and, hence, require a high firing current for ignition, e.g., a minimum of 1 to 5 amperes (D.C.).

Table I shows that the minimum currents, instantaneously applied, needed to cause ignition of the compositions of the invention are much higher than those needed under the same conditions to cause ignition of a standard ignition composition comprising a mixture of a lead nitrate-dibasic lead salt of 4,6-dinitro-o-cresol combination, potassium perchlorate, and selenium. Each squib in which the compositions were tested had a bridgewire 3/32 inch long of an 80/20 alloy of nickel and chromium, the bridgewire diameters being those shown in the table. The composition of the invention tested was a 27/67/6 blend of magnesium, tellurium, and tellurium dioxide.

Table I

| Bridgewire Diameter (inches) | Minimum Current to Ignite (amps., D.C.) | |
|---|---|---|
| | Mg-Te-TeO₂ Blend | Standard Composition |
| 0.0012 | 1.0 | 0.24 |
| 0.0015 | 1.5 | 0.32 |
| 0.0019 | 1.7 | 0.45 |
| 0.00275 | 2.5 | 0.67 |
| 0.0040 | 4.0 | |
| 0.0063 | 7.2 | 2.8 |

The compositions of the invention also have the desirable property of rapid functioning. For example, Table II shows that the squibs illustrated in Table I generally were ignited in less than 10 milliseconds when either a 3- or a 5-ampere direct current was applied to the leg wires. In these tests, the functioning times were determined by placing the squibs adjacent to charges of black powder of a standardized size and determining by means of a chronograph the time interval between the closing of the switch on the source of the firing current and the instant at which the flash from the ignition of the black powder actuated a photocell in the stop circuit of the chronograph.

Table II

| Bridgewire Diameter (inches) | Black Powder Ignition Time (milliseconds) | |
|---|---|---|
| | 3 amps. | 5 amps. |
| 0.0012 | 2.0 | 1.6 |
| 0.0015 | 2.5 | 1.7 |
| 0.0019 | 5.0 | 2.3 |
| 0.00275 | | 4.7 |
| 0.0040 | | 8.8 |

Squibs and like devices are used in applications involving a variety of environmental conditions. Thus, for example, they must function dependably at both high and low temperatures and under a variety of pressures. In addition, they often must be able to withstand relatively rapid changes in humidity and temperature. The following paragraphs illustrate the ability of the compositions of the invention to meet these requirements.

Squibs of the type shown in Figure 1 and containing an ignition charge of a loose 27/67/6 blend of magnesium, tellurium, and tellurium dioxide and a compressed base charge of lead azide were tested for functioning times at various temperatures by the method of Table II. The results (Table III) showed that the foregoing times at either high or low temperatures did not vary appreciably from those at ambient temperatures.

Table III

| Environment | Black Powder Ignition Time (milliseconds) |
| --- | --- |
| Dry Ice | 2.15 |
| 80° F. Water | 1.89 |
| 165° F. Water | 1.92 |

When squibs of the type shown in Figure 2 (a loose blend of magnesium, tellurium, and tellurium dioxide as the sole charge) were tested for functioning times at low pressures (1–2 mm. of mercury), there were no differences in functioning times between these squibs and the same type fired at atmospheric pressure.

Squibs of the type shown in Figure 2 and having a 0.004-inch-diameter bridgewire of the 80/20 nickel/chromium alloy mentioned previously were found to require a minimum direct current of 4.0 amperes for ignition at ambient temperatures. After these same squibs had been stored at 400–440° F. for 24 hours, the minimum current for ignition had increased only very slightly to 4.1 amperes. Storage of similar squibs (a loose blend of a 16/78/6 magnesium, tellurium, tellurium dioxide mixture as the only charge) at 160° F. or at 220° F. for two months did not affect the squib functioning times adversely.

The compositions of the present invention also are resistant to rapid changes in temperature and humidity. For example, squibs of the type shown in Figure 2 showed no increase in resistance or in functioning times (tested as in Table II) when they were cycled between hot, humid storage (+140° F.) and cold, dry storage (−60° F.) over a period of two weeks.

As was stated previously, resistance of squib compositions to ammonia gas is important in certain squib applications. A 27/67/6 blend of magnesium, tellurium, and tellurium dioxide was exposed to ammonia gas under a pressure of approximately 10 pounds per square inch gauge for two months before being loaded in squibs. No deleterious effects on the functioning times of the squibs were noted.

The ignition compositions of the present invention also have the advantage that their burning does not result in the production of gaseous products. Hence, squibs of the type shown in Figure 2 containing the present compositions have low brisance.

I have found that low brisance can be maintained in squibs containing the compositions of the invention when the compositions include tellurium dioxide in amounts up to about 30% by weight of the total compositions. Of course, in applications in which higher brisance either is desired or is of no consequence, I may use magnesium-tellurium-tellurium dioxide mixtures including more than 30% of the dioxide. The presence of tellurium dioxide in the compositions is critical. For example, when a 3-ampere (D.C.) firing current was applied to the leg wires of squibs containing a 27/73 blend of magnesium and tellurium, ignitions did not occur in 3 out of 5 cases. When the test was repeated at 5 amperes, ignitions did not occur in 2 out of 5 cases, and at 10 amperes, the functioning time (test of Table II) was 48 milliseconds. Suitably, the compositions may include between about 5 and about 30% of tellurium dioxide and, preferably, between about 5 and about 10% of the dioxide. On the other hand, the presence of the tellurium in the present ignition compositions is not critical. Tellurium containing between about 5 and about 10% of tellurium dioxide is available commercially and, hence, I have illustrated my process with this and similar mixtures which are both economical and easy to use from an operational standpoint. However, a 23/77 blend of magnesium and tellurium dioxide had functioning times of 3.2, 1.8, and 1.2 milliseconds at firing currents of 3, 5, and 10 amperes respectively, when tested by the method of Table II in a squib of the type shown in Figure 2. Hence, the compositions of the present invention function satisfactorily when they include no tellurium at all.

In the foregoing, I have shown that such mixtures as 27/67/6 or 16/78/6 blends of magnesium, tellurium, and tellurium dioxide are desirable ignition compositions. However, other proportions also are suitable, as illustrated by the operability of the representative blends shown in Table IV.

Table IV

| Ingredients (wt. percent) | | | Remarks |
| --- | --- | --- | --- |
| Mg | TeO₂ | Te | |
| 5 | 7 | 88 | Tested in squib of type in Fig. 2 by method of Table II. Firing current, 5 amps. (D.C.). Functioning time, 8 millisec. |
| 10 | 7 | 83 | Firing currents, 3 and 5 amps. Functioning times, 5.3 and 2.9 millisec., resp. |
| 17 | 29 | 54 | Firing currents, 3, 5, and 10 amps. Functioning times, 6.0, 3.0, and 2.6 millisec., resp. |
| 19 | 18 | 63 | Firing currents, 3, 5, and 10 amps. Functioning times, 6.2, 3.2, and 1.8 millisec., resp. |
| 36 | 5 | 59 | Firing currents, 6 and 12 amps. Functioning times, 6.6 and 2.7 millisec., resp. |
| 50 | 5 | 45 | Firing currents, 3 and 5 amps. Functioned at both levels, but very slowly. |

My invention encompasses blends including between about 5 and about 50% of magnesium, the remainder being tellurium dioxide or a mixture of tellurium dioxide and tellurium. However, for the best combination of effectiveness and economy, the compositions of the invention preferably will include between about 10 and about 30% of magnesium, between about 5 and about 10% of tellurium dioxide, and the remainder tellurium.

In the drawings, I have shown that the compositions of the present invention may be used in the form of loose intimate blends. However, as will be readily apparent to those skilled in the art, the choice of form and compression, if any, is not critical. Rather, such choices are dependent on the type of action desired and like factors generally.

Likewise, I may use the compositions as the sole charge in squibs and like devices. However, as Figure 1 illustrates, the compositions also may be used in combination with one or more other charges of deflagrating or detonating materials, again depending generally on the type of action desired.

The present invention has been described in detail in the foregoing. It will be apparent to those skilled in the art that many modifications are possible without departure from the scope of the invention. Hence, I intend to be limited only by the following claims.

I claim:
1. An ignition composition consisting essentially of an intimate mixture of 5 to 50% by weight of magnesium, from 5 to 30% by weight of tellurium dioxide, and the balance tellurium.
2. An ignition composition comprising an intimate mixture of between about 10 and about 30% of magnesium, between about 5 and about 10% of tellurium dioxide, and the remainder tellurium.

References Cited in the file of this patent

UNITED STATES PATENTS

| | | |
|---|---|---|
| 1,960,591 | Nash | May 29, 1934 |
| 2,337,314 | Deppeler | Dec. 21, 1943 |
| 2,410,801 | Audrieth | Nov. 12, 1946 |